No. 655,890. Patented Aug. 14, 1900.
C. J. PALMER.
RIM FOR DETACHABLE PNEUMATIC TIRES.
(Application filed May 29, 1900.)
(No Model.)
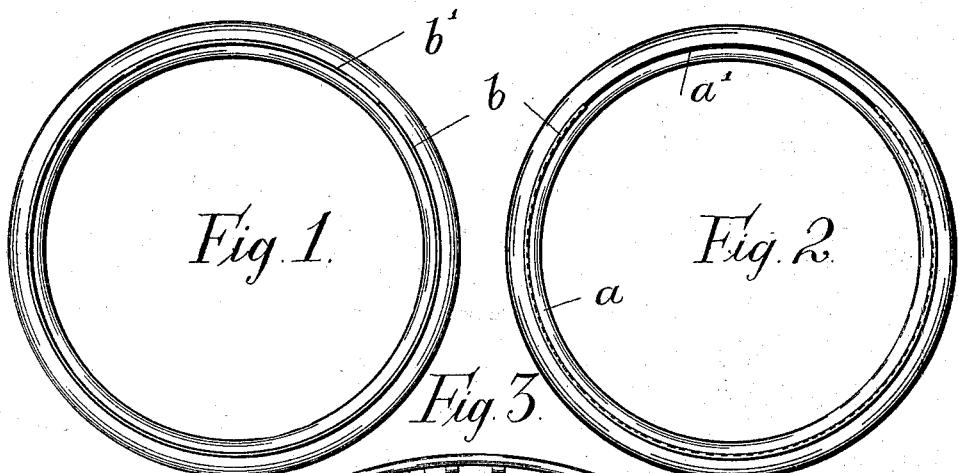
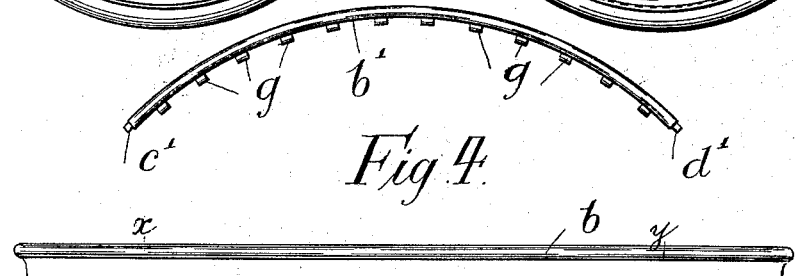
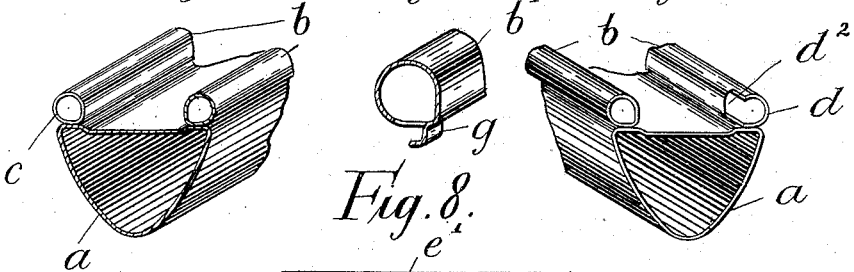
Witnesses:
Wm. H. Bates
A. G. Heyman
Inventor.
Charles J. Palmer.
by Herbert W. Jenner.
Attorney.

UNITED STATES PATENT OFFICE.

CHARLES JAMES PALMER, OF LONDON, ENGLAND.

RIM FOR DETACHABLE PNEUMATIC TIRES.

SPECIFICATION forming part of Letters Patent No. 655,890, dated August 14, 1900.

Application filed May 29, 1900. Serial No. 18,364. (No model.)

*To all whom it may concern:*

Be it known that I, CHARLES JAMES PALMER, a subject of the Queen of Great Britain and Ireland, residing at 25 Squarry street, Lower Tooting, London, in the county of Surrey, England, have invented certain new and useful Improvements in Rims More Particularly Intended for Use in Connection with Detachable Pneumatic Tires; and I do hereby declare the following to be a full, clear, and exact description of the invention, such as will enable others skilled in the art to which it appertains to make and use the same.

This invention relates to improvements in rims more particularly intended for use in connection with wired-on detachable pneumatic tires, of which, as an example, the well-known "Dunlop" tire may be referred to, the object of this invention being to provide means, as hereinafter fully set forth, for facilitating the removal of the tire from the rim when required, attendant advantages being that an absolutely-true seating of the tire on the rim is obtained to all practical intents and purposes, while a narrower and neater rim may be employed, as no depression of the wired edges of the cover toward the center of the rim to allow of the tire passing over the outer edge of the rim at a point diametrically opposite, is required, and which is necessary where the rims of the ordinary and well-known form are employed.

The essential feature of this invention consists in forming the rim, which is furnished with an upstanding edge or flange upon each side, with a detachable part or portion, and in order that the said invention may be fully understood I will now proceed to describe same with reference to the accompanying drawings, in which—

Figure 1 is a side view of a rim fitted with a tire and constructed according to this invention. Fig. 2 is a similar view with the detachable part removed. Fig. 3 is a side view of the said detachable part separated from the rim. Fig. 4 is a plan of the rim. Figs. 5 and 6 are sections taken on the lines $x\ x$ and $y\ y$, Fig. 4, respectively. Fig. 7 is a section of the detachable part. Fig. 8 illustrates a detail hereinafter referred to.

According to this invention the rim $a$ is furnished upon each side with an upstanding edge or flange $b$, a part $b'$ of which is detachable. In order to secure the said detachable part $b'$ in position for completing the upstanding edge or flange, this part is preferably of tubular form, or at the points $c\ d$, Fig. 4, it is furnished with recesses into which the reduced extremities $c'\ d'$ of the detachable part $b'$ enter. The part $b'$ is further furnished with a sufficient number of downwardly-extending projecting parts or hooks $g$, designed to pass through corresponding holes or perforations $g'$ in the bed of the rim $a$.

In order to secure the detachable part $b'$ in position, the reduced extremity $c'$ is placed within the tubular or recessed end $c$ of the upstanding edge or flange $b$, the projecting or hooked parts $g$ are then pressed through the holes or perforations $g'$ in the bed of the rim $a$, while the reduced extremity $d'$ is finally sprung into the tubular or recessed end $d$ of the flange $b$ through the side slot $d^2$, Fig. 4.

In some cases the detachable part $b'$ may be formed in two or more parts, in which case connection between the said parts is preferably made by a reduced extremity $e$ of the one part entering the tubular or recessed extremity $e'$ of the other part.

When the tire is inflated, the detachable part $b'$ is rigidly held in position by the side pressure exerted, while upon the tire being deflated and the detachable part $b'$ removed the outer cover may be readily taken off the rim by slipping it first over the edge of the rim at the part $a'$, Figs. 1 and 4, and then working it over the upstanding edge or flange $b$, while it may be as easily replaced by a reversal of this process.

As hereinbefore stated, the rim may be formed with a practically-flat bed, while the circumference of the edge of the cover need only be fractionally larger than that of the bed of the rim, and by this means the tire when in position lies upon the rim with a degree of truth almost unattainable with rims of the ordinary and well-known form.

The rim may be constructed in any suitable manner, no feature of novelty being claimed in this respect, and where possible the fixed upstanding edges or flanges $b$ are preferably formed integral with the rest of the rim.

Having now described my invention, what I claim as new, and desire to secure by Letters Patent, is—

1. The combination, with a wheel-rim having a projecting flange on one side which partially encircles it and has recesses in its ends, said rim having also a series of holes between the said recessed ends of the flange; of a detachable portion provided with projections which engage with the said recesses and holes, and forming a continuation of the said flange around the rim when secured in position, substantially as set forth.

2. The combination with a rim having upstanding edges or flanges such as $b$, of a detachable part such as $b'$, furnished with downwardly-extending projecting parts or hooks such as $g$ designed to pass through corresponding holes or perforations $g'$ in the bed of the rim $a$, and having reduced extremities $c'$ $d'$ designed to enter the tubular or recessed parts $c$ $d$ of the edge or flange $b$, substantially as herein described and shown and for the purposes specified.

In testimony whereof I affix my signature in presence of two witnesses.

CHARLES JAMES PALMER.

Witnesses:
G. SHEPHERD,
CHAS. LEARON.